(12) United States Patent
Pangrazio, III et al.

(10) Patent No.: US 10,218,509 B2
(45) Date of Patent: Feb. 26, 2019

(54) SYSTEM TO AUTHENTICATE 3D PRINTED OBJECTS

(71) Applicant: Xerox Corporation, Norwalk, CT (US)

(72) Inventors: Donald M. Pangrazio, III, LeRoy, NY (US); Jonathan D. Levine, Rochester, NY (US); Reiner Eschbach, Webster, NY (US); David R. Vandervort, Walworth, NY (US); Eugene S. Evanitsky, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 544 days.

(21) Appl. No.: 14/635,323

(22) Filed: Mar. 2, 2015

(65) Prior Publication Data

US 2016/0259306 A1 Sep. 8, 2016

(51) Int. Cl.
*B33Y 50/02* (2015.01)
*B33Y 80/00* (2015.01)
*H04L 9/32* (2006.01)
*G09C 1/00* (2006.01)
*G06T 19/20* (2011.01)

(52) U.S. Cl.
CPC .............. *H04L 9/3247* (2013.01); *G09C 1/00* (2013.01); *B33Y 50/02* (2014.12); *B33Y 80/00* (2014.12)

(58) Field of Classification Search
CPC .................. G06T 1/0028; G06T 1/005; G06T 2201/0061; G06T 19/20; B33Y 10/00; B33Y 70/00; B33Y 80/00; G06K 19/06056; G06K 9/00214

USPC ............................................... 700/95, 97, 98
See application file for complete search history.

(56) References Cited

U.S. PATENT DOCUMENTS

| 5,206,496 A | 4/1993 | Clement et al. |
|---|---|---|
| 7,589,868 B2 | 9/2009 | Velde et al. |
| 7,925,043 B2 | 4/2011 | Kazmaier et al. |
| 2012/0221135 A1* | 8/2012 | Kim ..................... A61C 9/0046 700/98 |
| 2013/0034633 A1 | 2/2013 | von Hasseln |

(Continued)

FOREIGN PATENT DOCUMENTS

| EP | 0686067 B1 | 8/2000 |
|---|---|---|
| EP | 0722386 B1 | 5/2001 |

(Continued)

OTHER PUBLICATIONS

Matt Petronzio, "How 3D Printing Actually Works," Mar. 28, 2013, Mashable, http://mashable.com/2013/03/28/3d-printing-explained/.

(Continued)

*Primary Examiner* — Michael J Brown
(74) *Attorney, Agent, or Firm* — Fay Sharpe LLP

(57) ABSTRACT

When printing 3D objects designed by a particular designer, authentication information such as a serial number and a digital signature of the designer are inserted into a CAD file for printing the object. The authentication information is represented as physical structures in or on the 3D-printed object. The physical structures (e.g., pits, cavities of one or more shapes, etc.) can be detected by a scanner (e.g., an ultrasound or the like), and the detected authentication information can be transmitted to an authentication server that determines the authenticity of the 3D-printed object and transmits the authenticity determination to a user.

21 Claims, 3 Drawing Sheets

(56) References Cited

U.S. PATENT DOCUMENTS

| | | | | |
|---|---|---|---|---|
| 2014/0062652 | A1* | 3/2014 | Roberson | G07C 11/00 340/5.8 |
| 2014/0124968 | A1* | 5/2014 | Kim | A61C 7/002 264/16 |
| 2015/0064299 | A1* | 3/2015 | Koreis | G06Q 30/0603 425/375 |
| 2015/0378353 | A1* | 12/2015 | Williams | G05B 19/4183 700/119 |
| 2016/0067927 | A1* | 3/2016 | Voris | B33Y 50/02 700/98 |

FOREIGN PATENT DOCUMENTS

| | | | |
|---|---|---|---|
| WO | 2010/075881 | A1 | 7/2010 |
| WO | 2012/146943 | A2 | 11/2012 |
| WO | 2013/126221 | A1 | 8/2013 |
| WO | 2013/149296 | A1 | 10/2013 |

OTHER PUBLICATIONS

"GIX Microplotter® II, Compact, precise picoliter printing," SonoPlot®, http://www.sonoplot.com/sites/default/files/specsheets/SpecSheet.pdf and http://www.sonoplot.com/products/gix-microplotter-ii.

"True 3D Color Printer," MCOR IRIS, Mcor Technologies, http://mcortechnologies.com/3d-printers/iris/.

Cameron Naramore, "Woodn't you know? Wooden Filament for 3D Printing," 3D Printer, http://www.3dprinter.net/wood-filament-for-3d-printing-lawoo-d.

"Communicate ideas; act on inspiration," Stratasys Ltd., http://www.stratasys.com/solutions-applications/prototyping/concept-modeling/marketing-and-graphic-design.

"3D print with precision in a wide range of materials," Stratasys Ltd., http://www.stratasys.com/3d-printers/technologies/polyjet-technology.

"Total extrusion zone, Tomorrow's batteries will be squeezed out of nozzles, like toothpaste," The Economist, http://www.economist.com/news/science-and-technology/21576378-tomorrows-batteries-will-be-squeezed-out-nozzles-toothpaste-total?fsrc=scn/tw/te/pe/totalextrusionzone.

Adi Robertson, "3D printed 'bionic' ear combines cartilage with an antenna," May 2, 2013, The Verge, http://www.theverge.com/science/2013/5/2/4292988/3d-printed-bionic-ear-made-from-cartilage-and-antenna.

"3D Systems to Acquire a Portion of Xerox's Oregon Based Solid Ink Engineering and Development Teams," Xerox Newsroom, Dec. 18, 2013, http://news.xerox.com/news/3D-Systems-to-acquire-a-portion-of-Xerox-solid-ink-engineering-and-development-teams.

"Public-key cryptography," Wikipedia, http://en.wikipedia.org/wiki/Public-key_cryptography.

* cited by examiner

SYSTEM TO AUTHENTICATE 3D PRINTED OBJECTS

TECHNICAL FIELD

The presently disclosed embodiments are directed toward authenticating 3D-printed objects. However, it is to be appreciated that the present exemplary embodiments are also amenable to other like applications.

BACKGROUND

Conventional scanners can make digital copies of existing three dimensional objects. These digital copies can be manufactured by 3D printers. For example, a 3D scanner can be used to create 3-dimensional models of a person's mouth and teeth. These models can be used by 3D printers to create teeth, bridges, and other dental prosthetics that fit precisely.

One disadvantage of low-cost 3D print manufacturing is that it greatly increases the potential for counterfeiting. Anyone with a 3D printer and a 3-D scanner will be able to reproduce another person's design undetectably and without permission, in some cases in violation of the law.

Various methods are used today to prevent counterfeiting and provide authentication. For instance, seals, watermarks and holograms have been proposed to provide reasonable protection against counterfeiters. Bar codes and (quick response) QR codes are used to identify and authenticate objects. Transparent objects, such as glass bottles, may have symbols engraved on or embedded in them. The problem with these methods is that they are obvious and therefore can also be copied, along with the object they intend to protect.

As 3D printing and scanning technologies become pervasive, large numbers of ordinary people may copy and manufacture other people's designs. Difficulties associated with counterfeit detection have already detrimentally impacted the music industry as ordinary people continue to copy and share digital files on a massive scale without compensating the artists or publishers. With the proliferation of 3D printers and scanners, similar widespread counterfeiting can be expected with respect to objects that can be generated using such technology.

There is a need in the art for systems and methods that facilitate providing authentication mechanisms for 3D-printed objects, while overcoming the aforementioned deficiencies.

BRIEF DESCRIPTION

In one aspect, a system that facilitates encoding authentication information as physical structures in a 3D-printed object comprises an authentication values database that stores authentication information describing one or more serial numbers and one or more digital signatures for authenticating 3D printed objects, and an authentication module programmed to receive authentication information for a 3D object to be printed, and insert authentication information code describing the authentication information at a predetermined location in a CAD file comprising instructions for printing the 3D object. The system further comprises a 3D printer that executes the CAD file with the inserted authentication information code and thereby generates the 3D object with authentication information embedded therein as one or more physical structures at a predetermined position within the 3D object that is indicated by the inserted authentication information code.

In another aspect, a method of encoding authentication information as physical structures in a 3D-printed object comprises storing authentication information describing one or more serial numbers and one or more digital signatures for authenticating 3D-printed objects receiving authentication information for a 3D object to be printed, and inserting authentication information code describing the authentication information at a predetermined location in a CAD file comprising instructions for printing the 3D object. The method further comprises executing the CAD file with the inserted authentication information code thereby generating the 3D object with authentication information embedded therein as one or more physical structures at a predetermined position within the 3D object that is indicated by the inserted authentication information code.

In yet another aspect, a system that facilitates determining the authenticity of a 3D-printed object comprises a 3D scanner programmed to scan a 3D-printed object and detect physical structures representative of authentication information encoded into the 3D object, and an authentication server configured to receive the detected authentication information from the 3D scanner, compare the detected authentication information to authentication information values stored in an authentication values database, and transmit an authenticity determination based on results of the comparison for display to a user.

DETAILED DESCRIPTION

The above-described problem is solved by providing a physical embodiment of digital security in a 3D printed object. The printed object itself (or part of the object) becomes its own public key. That is, the described systems and methods facilitate distinguishing between genuine and counterfeit objects by permitting authentication of objects manufactured using 3-dimensional printing technology.

Figure 1:
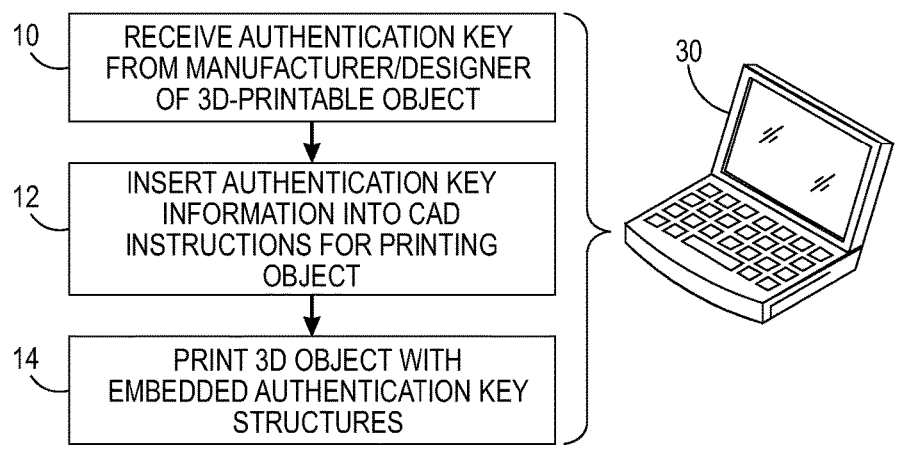
FIG. 1 illustrates a method for physically representing a security feature in a 3D printed object, in accordance with one or more features described herein.

FIG. 1 illustrates a method for physically representing a security feature in a 3D printed object, in accordance with one or more features described herein. At 10, authentication key information from a manufacturer or designer of a 3D-printable object is received or uploaded. At 12, the authentication key information is inserted into the code for printing the object. For instance, authentication information from a company that owns the object's design is inserted as an encrypted serial number and an encrypted signature as part of the object's design code. The encrypted serial number and signature are stored in the CAD file that specifies the object, i.e., the CAD file used to print the object.

At 14, the object is 3D-printed with the authentication information embedded therein as one or more physical structures. In one embodiment, the physical representation of these values is positioned as microscopic variations on the surface of the objects such as raised areas or pits (e.g. if they are to be read by a laser scanner). In another embodiment, the physical representation of these values will be positioned as microscopic cavities or structures inside the object (e.g. if they are to be read by an ultrasound scanner or other scanner capable of scanning into the object). In another embodiment, the object's design may have one or more values on the object's surface and one or more other values inside the object. The CAD software and interface allows the user to easily generate and position the physical representation of these encrypted values at design time.

It will be appreciated that the method of FIG. 1 can be implemented by a computer 30, which comprises a processor (such as the processor 204 of FIG. 5) that executes, and a memory (such as the memory 206 of FIG. 5) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 5), a system memory (see, e.g., FIG. 5), and a system bus (not shown) that couples various system components including the system memory to the processing unit. The processing unit can be any of various commercially available processors. Multiple microprocessors and/or multi-core processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2:
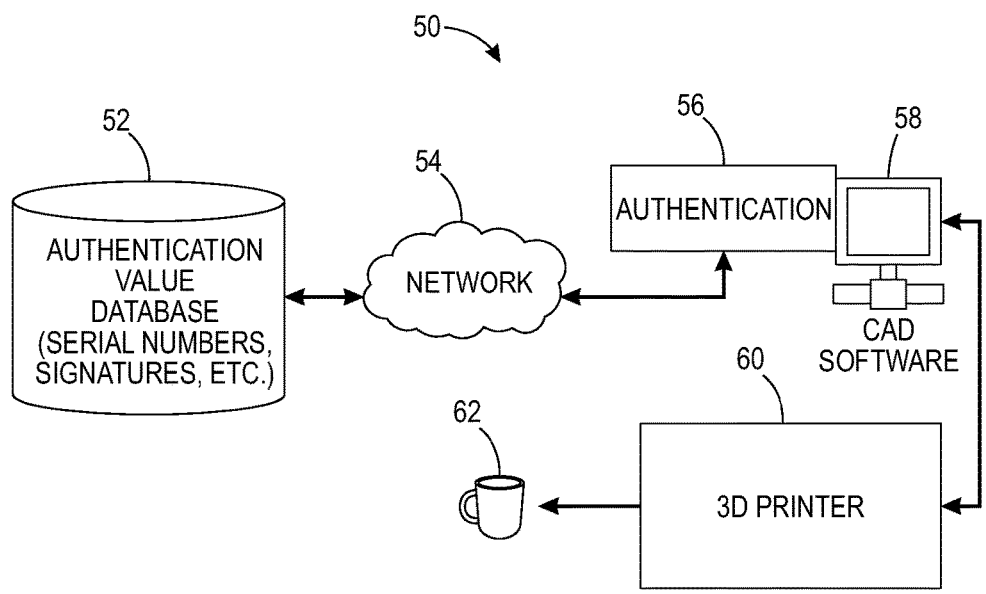
FIG. 2 illustrates a system that facilitates providing an authentication mechanism for authenticating 3D-printed objects, in accordance with various features described herein.

FIG. 2 illustrates a system 50 that facilitates providing an authentication mechanism for authenticating 3D-printed objects, in accordance with various features described herein. The system comprises an authentication value database 52 that is accessed via a network 54 by an authentication module 56, which enhances computer-aided design (CAD) module 58 in order to generate authentication information which is embedded on or in a 3D printed object. The CAD module is further coupled to a 3D printer 60 that prints the object 62.

The authentication value database 52 stores authentication values, such as encrypted serial numbers, signatures, and the like as public keys. For instance, a company that owns the object's design includes an encrypted serial number and an encrypted signature as part of the object's design. The encrypted serial number and signature are also stored in the CAD file that specifies the object, i.e., the CAD file used to print the object. The serial number is unique and may represent a design, or it may be different for each individual object produced from a particular design. The signature is the mark that indicates the person or company that owns the design of the object, and is unique. Other encrypted values with their own semantics meaningful to the object's owner also may be included. For example, a serial number can be employed for a design and a separate serial number for each object produced from that design. Each of these values is represented as a microscopic physical structure which is part of the object itself; that is, each value is built into the physical object when it is manufactured. Each of these values is positioned on the object in such a way that it can be read by a 3-dimensional scanner.

The authentication module enhances the CAD Software with public and private key operations and metadata storage. The CAD software used to design objects for 3-dimensional printing also includes functionality that enables the object designer to create and protect the private keys associated with each value built into the object. In addition to creating the public and private key values, this also involves submitting a second set of values, the private keys, to the authentication module 56 (or its database 52) for storage for later use, i.e. when the private keys are needed for an authentication operation. The storage of the private keys (and any other metadata such as object-creation date, etc.) is the process which registers the object as "available for authentication." An authorized user can configure this registration process to happen when the 3D printer completes the object, when the object is approved for sale, when the CAD design is complete, or at any other specified time. An authorized user can also determine or indicate the level of security by specifying that the CAD software generate longer keys (to increase the security level) or shorter keys (to decrease the security level). It will be appreciated that the herein described authentication module can be built into CAD software or built as an add-on to off-the-shelf CAD software (e.g., AutoCAD®, Mastercam® CAD, etc.).

Physical representations of encrypted serial numbers, signatures, and other values are exemplified as follows. Numerals such as 8, eight, ocho, 100-92, the square root of sixty four, etc., are symbols used to represent numbers.

Physical structures can also be used as numerals (for example, CD and DVD technologies represent numbers physically). In one embodiment, values such as serial numbers and signatures are represented by physical structures that are embedded in the larger 3D-printed object. These structures can take the form of, for example, a set of raised bits of material on the surface of the object, a set of pits on the surface of the object, etc. In another embodiment, a set of cavities is buried inside the object. This embodiment has the additional advantage of remaining useful for authentication even when there is wear on the surface of the object. Additionally, the cavities are hidden from the user and from potential counterfeiters.

With regard to the internal or external structure of the object, in one embodiment, the object is constructed with interlocking fibers, and the fibers or a subset of the fibers are arranged as a numeral or set of numerals. In another embodiment, the object is constructed of distinct and detectable substrates (as opposed to the above methods that can be used with one substrate). For example, detectable metal particles may be embedded in the object in a pattern that represents the desired authentication values (e.g. serial number; signature; etc.). During authentication, these patterns can be detected with X-rays, even when there is wear on the surface of the object.

In another embodiment, the authentication structures have a predetermined size of, e.g., 5 microns, and are formed as pits on the object's surface, with each pit representing a base 2 integer. In one example, an oval (or other shape) pit can represent a 0 and a rectangular (or other shape) pit can represent a 1. It will be appreciated that many other physical representations can be employed, such as using Xerox's glyph technology such that e.g. left-pointing diagonal marks indicate a 0 and right-pointing diagonal marks indicate a 1), etc. Furthermore (in this example), in one embodiment, a set of pits in a specific, defined location can be used to represent a particular meaning, e.g. the object's serial number. In a different embodiment, the semantics can be encoded within the set of pits itself. While invisible to the eye, the 3D scanner reads and transmits the value to the authentication server.

The CAD software includes the ability to specify the semantics, structure, and location (in the object) of these physical numerals. The semantics (e.g. this is the serial number for the given product manufactured by the given manufacturer) is built into the numeral itself. In another embodiment, the semantics can be defined by the position of the numerals. To protect the semantics, the numeral can be encrypted. The CAD software can communicate the values it has built into the object to the authentication values database or, in another embodiment, a protected database accessible to both the CAD software and authentication server.

The authentication system includes some elements that will be configured. In particular, the authentication software stored and executed on the authentication server may be configured to know in advance the identity of scanners from which it is allowed to receive requests, and the scanners may be configured to know in advance the identity of authentication servers/software with which they can communicate.

In accordance with one example, manufacturer ABC designs coffee cups and manufactures them using 3D printing. To ensure that its cups can be identified as authentic ABC cups, it embeds a unique serial number (for each cup) on the bottom of its cups and ABC's signature on the part of the cup between the points where the top and bottom of the handle attach to the cup.

During the design process, the CAD software creates the serial number (different for each design) and the signature and encrypts them using key X and key Y (which are validated by a certificate authority such as Verisign or the like). The CAD software represents the encrypted serial number and the signature in the design using microscopic, raised ovals (representing zeros) and squares (representing ones). The serial number is created using key X, validated by the certificate authority. The key is public but only the owner of the associated private key can validate the serial number. The resulting signature is embedded as microscopic ovals and squares, etc.

In addition, the designer uses the CAD software to send a private key for the object's serial number to the authentication server's database (the private key for the signature is already registered in the database), along with the designer's name, and design date. At this point, the object is ready to be authenticated.

Figure 3:
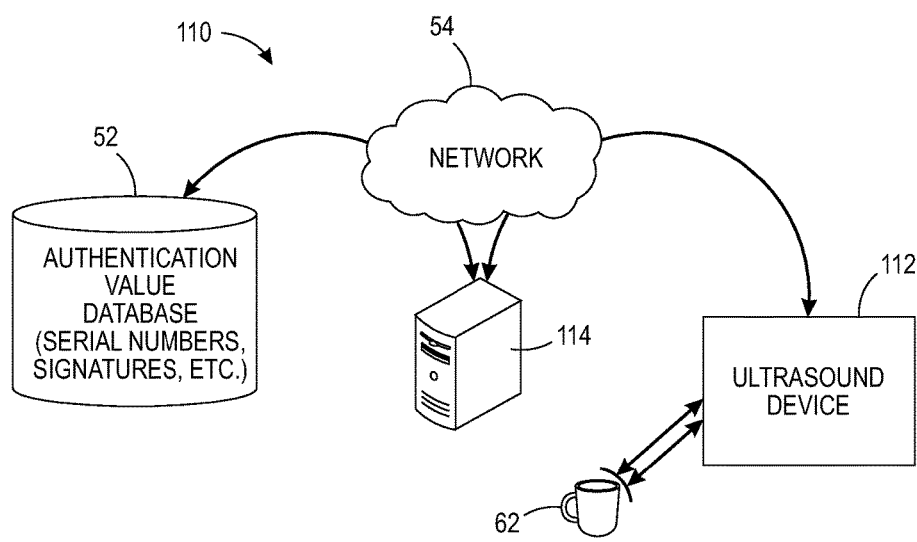
FIG. 3 illustrates a system that facilitates detecting authentication information (using, e.g., an ultrasound scanner) in a 3D printed object and authenticating the object, in accordance with one or more aspects described herein.

FIG. 3 illustrates a system 110 that facilitates detecting authentication information in a 3D printed object 62 and authenticating the object, in accordance with one or more aspects described herein. An enhanced 3D scanner 112 detects the serial number and/or the signature on and/or in the object and communicates via the network 54 with a remote server 114 coupled to the authentication value database 52 where the private key and the database of serial numbers are stored. Different embodiments of the scanner may include laser, ultrasound, X-ray, or other technologies. The scanner reads the authentication information from the object 62 and transmits it via the network 54 to the authentication server, which reads the encrypted authentication values, decrypts them, and validates their authenticity. The server 114 also includes or accesses the database 52 of serial numbers and private keys that are exclusive to the designer of the object. The database 52 is itself encrypted and protected for use only by authorized users.

The 3-dimensional scanner 112 reads the raised numerals and/or cavity numerals on the surface of the object, and/or cavity numerals inside the object's structure. The scanner communicates these values it has read from the object to the authentication server 114 and can also display the result of the authentication operation. In one embodiment, the scanner detects and communicates its own GPS coordinates or other location information and/or identifies and validates the scanner's user (e.g. by fingerprint recognition). Such metadata can be used by the authentication server to assist in the authentication.

Additionally or alternatively, the scanner 112 can be specifically associated with a particular design firm, in which case it can submit that firm's information to the authentication server, thereby mitigating a need to encode the information in the values. In this case, the scanner's own ID, encrypted, is included in the communication with the authentication server. When the scanner receives communications from the authentication server, the scanner can ensure that it is communicating with a valid authentication source.

In one embodiment, the scanner is a custom piece of hardware. In another embodiment, the scanner comprises an app downloaded to a smart-phone. The scanner can communicate with the authentication server via a global network (in one embodiment, the internet) and/or by manual file sharing (e.g. generating a file which a person stores and then manually uploads to the authentication server).

On receiving an authentication request from the 3D scanner 112, the authentication server 114 determines a result. In one embodiment, the server may return only simple results (e.g. authentic/not-authentic/not known, etc.). In another embodiment, more complex analysis may be available (e.g. needs further investigation; a list of items that need to be determined, etc.). To produce the result, the authentication server receives an authentication request from a 3D scanner (either automatically over the network or manually through a file upload). The request includes one or more of the appropriate values (e.g. serial number and signature) and can also include metadata (e.g. the location of the scanner and/or object, the scanner's ID, the object's designer, etc.). The authentication server decrypts and validates the scanner's ID. The authentication server then decrypts the authentication values it has received and uses those values and any metadata it has received to compare against the authentication values database 52 for known values and current meta-information. The authentication server determines whether the signature/serial number combination it has received describes an authentic object and, in particular, the authentic object. The authentication server can run in the cloud or in a private data center. In either case, its communications are encrypted. When communicating (e.g. with a requesting scanner), the authentication server also provides its own encrypted ID.

Figure 4:
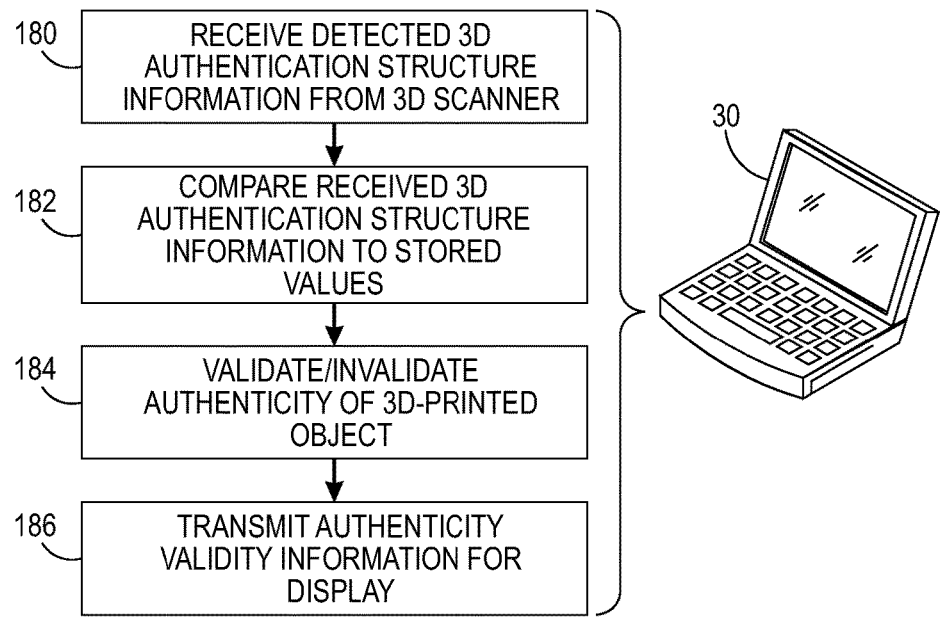
FIG. 4 illustrates a method of authenticating a 3D printed object having authentication information embedded therein as one or more physical structures during 3D printing of the object, in accordance with one or more features described herein.

FIG. 4 illustrates a method of authenticating a 3D printed object having authentication information embedded therein as one or more physical structures during 3D printing of the object, in accordance with one or more features described herein. At 180, detected 3D authentication information is received from a scanner device. At 182, the received 3D authentication structure information is compared to stored values. At 184, the authenticity of the 3D-printed object is determined as a function of the comparison. At 186, the determination of the object's authenticity is transmitted for display to a viewer. In one embodiment, the authenticity determination is displayed to the viewer on a webpage upon the viewer logging on to a website. In another embodiment, the authentication determination is displayed to the viewer on the scanner device used to scan the 3D printed object or a peripheral device in communication with the scanner.

According to an example, a collector wants to purchase a pistol from a dealer at a gun show. The pistol was ostensibly designed and produced by a large gun manufacturer. As part of his hobby, the collector has invested in his own combination laser and ultrasound scanner. He points the scanner at the gun. The scanner reads the serial number (on the surface of the pistol) with the laser and the signature data (buried inside of the pistol) with the ultrasound and sends that information to the manufacturer's authentication server. The authentication server detects that the manufacturer has not produced a pistol with that combination of serial number and signature and returns an authentication failure message, which the scanner displays.

According to another example, a retailer wants to purchase an artistic vase from a dealer in New York City. The vase was ostensibly designed by a world-famous design firm. The object was produced by 3-dimensional printing methods and has a built-in authentication mechanism. The retailer accesses a 3-dimensional object authentication app from the design firm's web site. He points his smart-phone at the vase, and using ultrasound, the smart-phone scans the vase, sends the serial number and signature data to the authentication software which sends back a caution. The last known location of this particular vase was not at the smart-phone's current location, but was instead in Paris. The retailer decides to investigate the authenticity of the vase and calls the design firm for further consultation.

Figure 5:
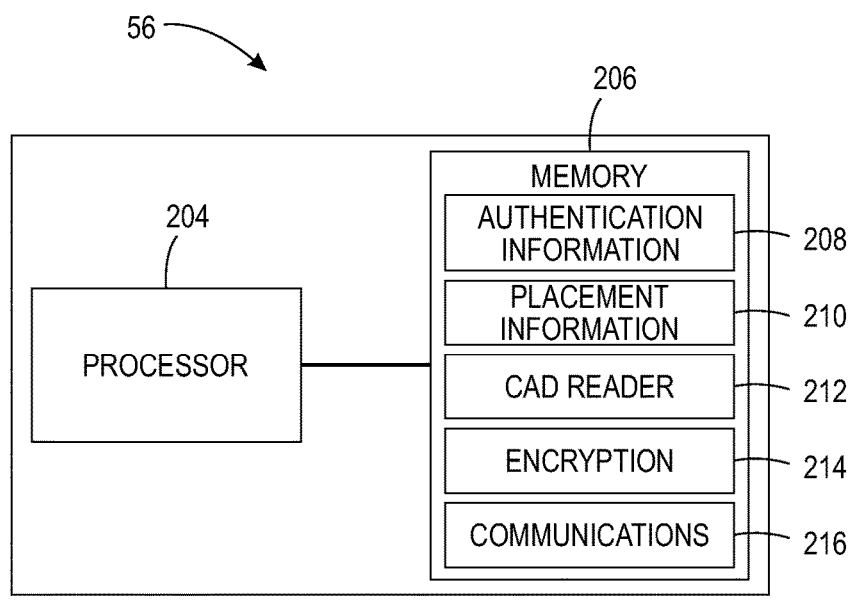
FIG. 5 illustrates the authentication module, which inserts authentication information into a CAD design file for a 3D-printable object, in accordance with one or more features described herein.

FIG. 5 illustrates the authentication module 56, which inserts authentication information into a CAD design file for a 3D-printable object, in accordance with one or more features described herein. The authentication module 56 comprises a processor 204 that executes, and a memory that stores, computer-executable instructions for performing the various functions, methods, etc., described herein. The authentication information 208 (e.g., serial number, object designer signature, etc.) is stored in the memory 206 along with placement information 210 that describes where the authentication information is to be physically constructed within or on the 3D object during printing. The placement of the authentication information structures is selected such that the authentication structures do not impact the integrity (e.g., strength or durability, etc.) or functionality of the printed 3D object. In some scenarios, it may be desirable to redundantly place the same authentication information in multiple locations on the object. This ensures that the authentication information will still be available if part of the object containing one of the instances of that information is damaged.

A CAD reader 212 is executed by the processor and reads the CAD design file for the 3D printed object. The processor determines where within the CAD file the authentication information is to be inserted, and inserts authentication information code into the CAD file at the appropriate location to ensure that the authentication structures are embedded in the 3D-printed object at the desired physical location. Additionally, the authentication module comprises an encryption module 214, which, when executed by the processor, encrypts the authentication information before or during its insertion into the CAD file.

The processor executes a communication module 216 that communicates with the CAD program and inserts the authentication information into the CAD file. In one embodiment, the authentication information code is inserted at the authentication module 56. In another embodiment, the authentication module transmits the authentication information code to the CAD program (FIG. 2) with instructions for inserting the code at the appropriate location in the CAD file. Additionally, the communication module communicates with the authentication values database (FIG. 2) to provide the authentication information and/or encrypted authentication information to the authentication values database for comparison to scanned values at a later time when the 3D-printed object is scanned to determine its authenticity.

The exemplary embodiments have been described. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A system that facilitates encoding authentication information as physical structures in a 3D-printed object, comprising:
   an authentication values database that stores authentication information describing one or more serial numbers and one or more digital signatures for authenticating 3D printed objects;
   an authentication module programmed to:
   receive authentication information for a 3D object to be printed; and insert authentication information code describing the authentication information at a predetermined location in a CAD file comprising instructions for printing the 3D object; and a 3D printer that executes the CAD file with the inserted authentication information code and thereby generates the 3D object with authentication information embedded therein as one or more physical structures at a predetermined position within the 3D object that is indicated by the inserted authentication information code, wherein the authentication module further comprises an encryption module that encrypts the authentication information prior to insertion into the CAD file.

2. The system according to claim 1, wherein the physical structures generated in the 3D-printed object have a size that is not visible to an unaided human eye.

3. The system according to claim 1, wherein the physical structures generated in the 3D-printed object are cavities in the 3D printed object.

4. The system according to claim 3, wherein the cavities are generated to have different shapes relative to each other, the different shapes corresponding to different alphanumeric values.

5. The system according to claim 3, wherein the predetermined position is selected to have a negligible impact on the integrity of the 3D-printed object.

6. The system according to claim 1, wherein the predetermined position is on the surface of the 3D printed object, and wherein the physical structures comprise one or more of pits and raised structures.

7. The system according to claim 6, wherein the one or more of the pits and the raised structures are generated to have one or more of different shapes and different sizes relative to each other, the one or more of the different shapes and different sizes corresponding to different alphanumeric values.

8. The system according to claim 1, wherein the physical structures generated in the 3D-printed object represent encrypted authentication information values.

9. A method of encoding authentication information as physical structures in a 3D-printed object, comprising:

storing authentication information describing one or more serial numbers and one or more digital signatures for authenticating 3D-printed objects;

receiving authentication information for a 3D object to be printed;

inserting authentication information code describing the authentication information at a predetermined location in a CAD file comprising instructions for printing the 3D object; and executing the CAD file with the inserted authentication information code thereby generating the 3D object with authentication information embedded therein as one or more physical structures at a predetermined position within the 3D object that is indicated by the inserted authentication information code, wherein the authentication information is encrypted prior to insertion into the CAD file.

10. The method according to claim 9, wherein the physical structures generated in the 3D-printed object have a size that is imperceptible to an unaided human eye.

11. The method according to claim 9, wherein the physical structures generated in the 3D-printed object are cavities in the 3D printed object.

12. The method according to claim 11, wherein the cavities are generated to have different shapes relative to each other, the different shapes corresponding to different alphanumeric values.

13. The method according to claim 11, wherein the predetermined position is selected to have a negligible impact on the integrity of the 3D-printed object.

14. The method according to claim 9, wherein the predetermined position is on the surface of the 3D printed object, and wherein the physical structures comprise one or more of pits and raised structures.

15. The method according to claim 14, wherein the one or more of the pits and raised structures are generated to have one or more of different shapes and different sizes relative to each other, the one or more of the different shapes and different sizes corresponding to different alphanumeric values.

16. The method according to claim 9, wherein the physical structures generated in the 3D-printed object represent encrypted authentication information values.

17. A system that facilitates determining the authenticity of a 3D-printed object, comprising:

a 3D scanner programmed to scan a 3D-printed object and detect physical structures representative of authentication information encoded into the 3D object;

an authentication server configured to:
receive the detected authentication information from the 3D scanner;
compare the detected authentication information to authentication information values stored in an authentication values database; and
transmit an authenticity determination based on results of the comparison for display to a user.

18. The system according to claim 17, wherein the 3D scanner is an ultrasound device.

19. The system according to claim 17, wherein the 3D scanner is an x-ray device.

20. The system according to claim 17, wherein the authentication server is further configured to decrypt encrypted authentication information received from the 3D scanner.

21. The system according to claim 17, wherein the authentication server is further configured to:
receive information related to the position of the physical structures within the 3D-printed object;
compare the received position information to position information in the authentication values database; and
consider the position of the physical structures within the 3D-printed object when determining the authenticity of the 3D printed object.

* * * * *